(12) United States Patent
Yang et al.

(10) Patent No.: US 8,805,956 B1
(45) Date of Patent: Aug. 12, 2014

(54) DATA LEAKAGE PREVENTION IN CLOUD-ENDPOINT MODEL

(75) Inventors: Shun-Fa Yang, Taipei (TW); Chung-Tsai Su, Xindian (TW); Geng Hwang Twu, BanChiao (TW); Haoping Liu, Changhua (TW)

(73) Assignee: Trend Micro, Inc., Tokyo (JP)

( * ) Notice: Subject to any disclaimer, the term of this patent is extended or adjusted under 35 U.S.C. 154(b) by 115 days.

(21) Appl. No.: 13/246,603

(22) Filed: Sep. 27, 2011

(51) Int. Cl.
*G06F 15/16* (2006.01)

(52) U.S. Cl.
USPC .......................................................... 709/217

(58) Field of Classification Search
USPC ................... 345/690; 709/201–207, 217–246
See application file for complete search history.

(56) References Cited

U.S. PATENT DOCUMENTS

| | | | | |
|---|---|---|---|---|
| 5,629,984 | A * | 5/1997 | McManis | 380/54 |
| 8,380,676 | B1 * | 2/2013 | Eastham et al. | 707/662 |
| 2004/0054777 | A1 * | 3/2004 | Ackaouy et al. | 709/225 |
| 2005/0020278 | A1 * | 1/2005 | Krumm et al. | 455/456.1 |
| 2005/0096069 | A1 * | 5/2005 | Lee | 455/456.5 |
| 2005/0165922 | A1 * | 7/2005 | Hatano | 709/223 |
| 2006/0117136 | A1 * | 6/2006 | Tran et al. | 711/112 |
| 2006/0117153 | A1 * | 6/2006 | Tran et al. | 711/159 |
| 2007/0208915 | A1 * | 9/2007 | Tran et al. | 711/159 |
| 2008/0103923 | A1 * | 5/2008 | Rieck et al. | 705/26 |
| 2009/0010617 | A1 * | 1/2009 | Jones et al. | 386/124 |
| 2009/0098857 | A1 * | 4/2009 | De Atley | 455/411 |
| 2009/0132543 | A1 * | 5/2009 | Chatley et al. | 707/10 |
| 2009/0241167 | A1 * | 9/2009 | Moore | 726/1 |
| 2009/0292796 | A1 * | 11/2009 | Huang | 709/222 |
| 2010/0005013 | A1 * | 1/2010 | Uriarte | 705/30 |
| 2010/0306175 | A1 * | 12/2010 | Johnson et al. | 707/663 |
| 2010/0325362 | A1 * | 12/2010 | Kohavi | 711/133 |
| 2011/0067119 | A1 * | 3/2011 | Baum | 726/34 |
| 2011/0081895 | A1 * | 4/2011 | Ohashi | 455/414.1 |
| 2011/0270757 | A1 * | 11/2011 | Hammad | 705/44 |
| 2011/0273485 | A1 * | 11/2011 | Coup et al. | 345/690 |
| 2011/0307724 | A1 * | 12/2011 | Shaw et al. | 713/323 |
| 2012/0102549 | A1 * | 4/2012 | Mazzaferri et al. | 726/4 |
| 2012/0129547 | A1 * | 5/2012 | Andrews et al. | 455/456.1 |
| 2012/0227112 | A1 * | 9/2012 | Capasso et al. | 726/29 |

(Continued)

OTHER PUBLICATIONS

NedPyle (NedPyle, The LastLogonTimeStamp Attribute—What it was designed for and how it works, Apr. 15, 2009, Technet, http://blogs.technet.com/b/askds/archive/2009/04/15/the-lastlogontimestamp-attribute-what-it-was-designed-for-and-how-it-works.aspx, pp. 1-8).*

*Primary Examiner* — Brian J Gillis
*Assistant Examiner* — Michael A Keller
(74) *Attorney, Agent, or Firm* — Beyer Law Group LLP (57) ABSTRACT

A data access policy is configured and stored on a computing device, including a list of secure gateway IP addresses and optionally secure geographic regions. A time parameter defines how long a digital file will remain not in use before deletion and a degree parameter defines how fast the file will be deleted. Once a digital file is downloaded to the computing device the device is checked periodically to determine whether or not it is in a secure location. If not in a secure location then a data deletion process is initiated which begins by checking whether or not the digital file is currently being used on the computing device. If the file is being used, then no deletion is performed. If the file is not in use (or has not been used after a certain amount of time) then the file is deleted. The file may be deleted gradually.

27 Claims, 4 Drawing Sheets

(56) References Cited

U.S. PATENT DOCUMENTS

2012/0240213 A1* 9/2012 Lin et al. .................. 726/12
2012/0254402 A1* 10/2012 Panidepu et al. ............. 709/224
2012/0311154 A1* 12/2012 Morgan ....................... 709/226
2013/0030934 A1* 1/2013 Bakshi et al. ................. 705/18

* cited by examiner

DATA LEAKAGE PREVENTION IN CLOUD-ENDPOINT MODEL

FIELD OF THE INVENTION

The present invention relates generally to data loss prevention. More specifically, the present invention relates to deletion of sensitive data on a computing device based upon location and time.

BACKGROUND OF THE INVENTION

Information within organizations and entities is often classified as sensitive either for business reasons or for legal reasons. This information may reside within documents, drawings, machinery, layout, use of equipment, text files, databases, images, pictures, etc. In addition to the potential threat of an unscrupulous party illegally accessing the organization from the outside via an electronic network, and then removing or disrupting the information, there exists the risk of intentional or inadvertent transmission of the sensitive information from inside the organization to the outside. For example, a disgruntled employee might send an image of a sensitive document to which he or she has access to an outside party via a mobile device, thus causing harm to the organization.

In addition to simple business reasons for not wanting sensitive information to be released, i.e., the desire to keep trade secrets secret, many new government regulations mandate controls over information (requiring the sensitive information not to be released outside the company) and companies must comply in view of significant penalties. For example, HIPAA regulates health information, BASEL II regulates financial information, Sarbanes-Oxley regulates corporate governance, and a large number of states have passed data privacy laws requiring organizations to notify consumers if their information is released. Companies are even subject to a regular information technology audit which they can fail if they do not employ suitable controls and standards.

Technology companies have reacted to this environment with a host of data loss prevention (DLP) products. These products are typically hardware/software platforms that monitor and prevent sensitive information from being leaked outside the company. These DLP products are also known as data leak prevention, information leak prevention, etc. Gateway-based DLP products are typically installed at the company's Internet network connection and analyze outgoing network traffic for unauthorized transmission of sensitive information. These products typically generate a unique signature of the sensitive information when stored within the company, and then look for these signatures as information passes out over the network boundary, searching for the signatures of the sensitive information. Host-based DLP products typically run on end-user workstations within the organization. These products can address internal as well as external release of information and can also control information flow between groups of users within an organization. These products can also monitor electronic mail and instant messaging communications and block them before they are sent.

Sensitive information from within a company—or sensitive information of an individual—may be in the form of text, numerical information, a picture, image or video, and may be transmitted from a computer server to an endpoint computing device of the individual. For example, certain sensitive data of individual (such as bank account information or individual-specific company information) is very important to an individual and should not be lost or inadvertently revealed. Unauthorized use of an individual's sensitive information may cause a financial loss or damage to personal reputation. In today's environment where more and more people use a mobile telephone to legally download their own needed sensitive information (perhaps for a temporary use) it can be more important to safeguard this information because a mobile telephone may be easily lost, stolen or taken temporarily. Further, individuals are often using public computers or other computers in a location that is not secure.

Previous techniques have used a policy-based data loss prevention technique in order to scan the contents of the data before it is transferred or downloaded, and to block the data or to encrypt it if a policy is violated. But, implementing and enforcing a data usage policy is resource intensive and encrypting the data may not always be viable. What is desired is an improved technique for preventing the loss of sensitive information while allowing an individual to access the information where appropriate.

SUMMARY OF THE INVENTION

To achieve the foregoing, and in accordance with the purpose of the present invention, a data loss prevention technique is disclosed that automatically deletes sensitive information after period of time.

Instead of a complicated data content scanning or encryption technique, a cloud-endpoint model is used along with automatic data deletion. A user's data may be stored "in the cloud," i.e., on a computer server accessible over the Internet, and this data is downloaded to a user endpoint device (e.g., personal computer, desktop computer, laptop computer, mobile telephone, etc.) but is then deleted after a certain time interval. One advantage is that better security is provided for sensitive data that is stored "in-the-cloud."

In one embodiment, a data access policy is configured and stored on the computing device. Once a digital file is downloaded to the computing device the device is checked periodically to determine whether or not it is in a secure location. If it is not in a secure location then a data deletion process is initiated which begins by checking whether or not the digital file is currently being used on the computing device. A configurable parameter informs whether the file is being used by determining for how long the file has not been used. If the file is being used then no deletion is performed. But, if the file is not in use (or has not been used after a certain amount of time) then the file is deleted. The file may be deleted gradually over a time interval.

In a second embodiment, a data access policy is configured and stored on the computing device. A secure location is defined as a specific geographic area in which the computing device must be located using GPS technology. Once a digital file is downloaded to the computing device the device is checked periodically to determine whether or not it is in the secure location. If it is not in the secure location then a data deletion process is initiated which begins by checking whether or not the digital file is currently being used on the computing device. If the file is being used then no deletion is performed. But, if the file is not in use (or has not been used after a certain amount of time) then the file is deleted.

In a third embodiment, a data access policy is configured and stored on the computing device. A secure location is defined as whenever the computing device is connected to a network using one of a particular set of gateway IP addresses. Once a digital file is downloaded to the computing device the device is checked periodically to determine whether or not it is in the secure location. If it is not in the secure location then a data deletion process is initiated which begins by checking whether or not the digital file is currently being used on the computing device. If the file is being used then no deletion is performed. But, if the file is not in use (or has not been used after a certain amount of time) then the file is deleted.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, while it is desirable to allow a user to access his or her sensitive information when needed, it can also be important to make sure that this sensitive information is eventually deleted from the user's computing device. For example, if the user is in a restaurant and wishes to download his or her sensitive data for a particular reason, the user will be allowed to download that data. But, because a restaurant may not be deemed a secure location, a data deletion process may be activated such that the sensitive data will be deleted after predefined time if the data is not being used.

Figure 1:
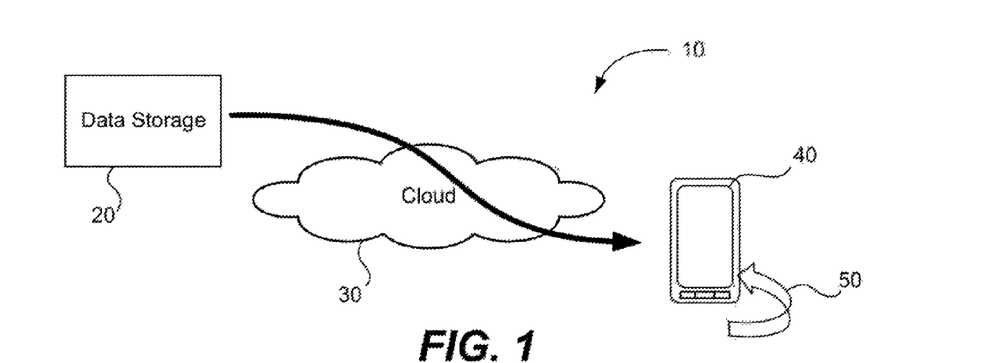
FIG. 1 illustrates an environment in which the present invention may be used.

FIG. 1 illustrates an environment 10 in which the present invention may be used. Shown is a data storage location 20 from which sensitive data may be downloaded via a network such as the Internet 30 to a computing device such as a mobile telephone 40. Storage location 20 may be any suitable computer such as a Web server, a database server, a personal computer, or other computing device from which files may be downloaded. Network 30 is any suitable data communications network such as a local area network, a wide area network or the Internet, over which the user may wish to download or transfer sensitive data to his or her computing device via a wired or wireless connection. Computing device 40 may be a desktop computer, a laptop computer, a personal digital assistant, a smart phone, a mobile telephone, or any other suitable computing device to which the user wishes to transfer sensitive data and upon which the present technique may execute.

Preferably, computing device 40 includes suitable hardware and software allowing a computer program to execute and implement the present invention as described below and indicated by symbol 50. In one embodiment, the present invention may be programmed using software such as JAVA to develop an Android operating system application.

For example, the computer program may be in the form of a software application installed permanently on the user's computer, or may be in the form of an application downloaded to the user's mobile telephone or mobile computing device when desired. In another embodiment, the computer program may be integrated with a software application on the computing device such as an e-mail program. When an incoming e-mail message includes an attachment, the present invention may automatically determine whether or not the attached digital file is a sensitive file or not. In general, the program may be integrated with any software application with an SDK or API, the program can then use the SDK or API to integrate with the software application. For example, the Android operating system is open, meaning that its SDK and any API is available for use in order to integrate the program into any Android application such as an Android native SMS or e-mail client.

Figure 2:
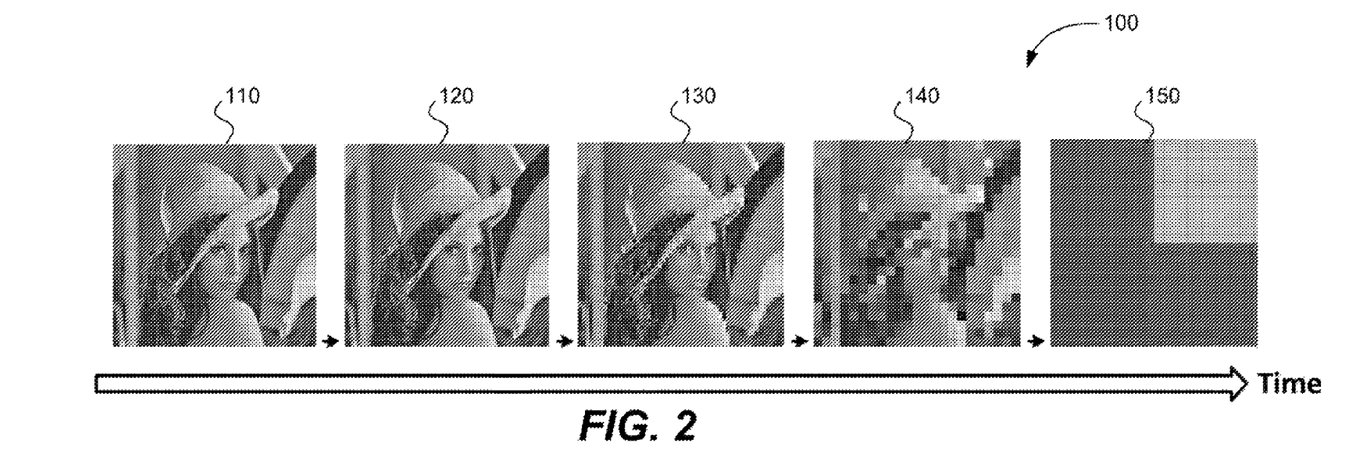
FIG. 2 illustrates an example of a data deletion process.

FIG. 2 illustrates an example of a data deletion process 100 which will be discussed in further detail below.

Flow Diagram

Figure 3:
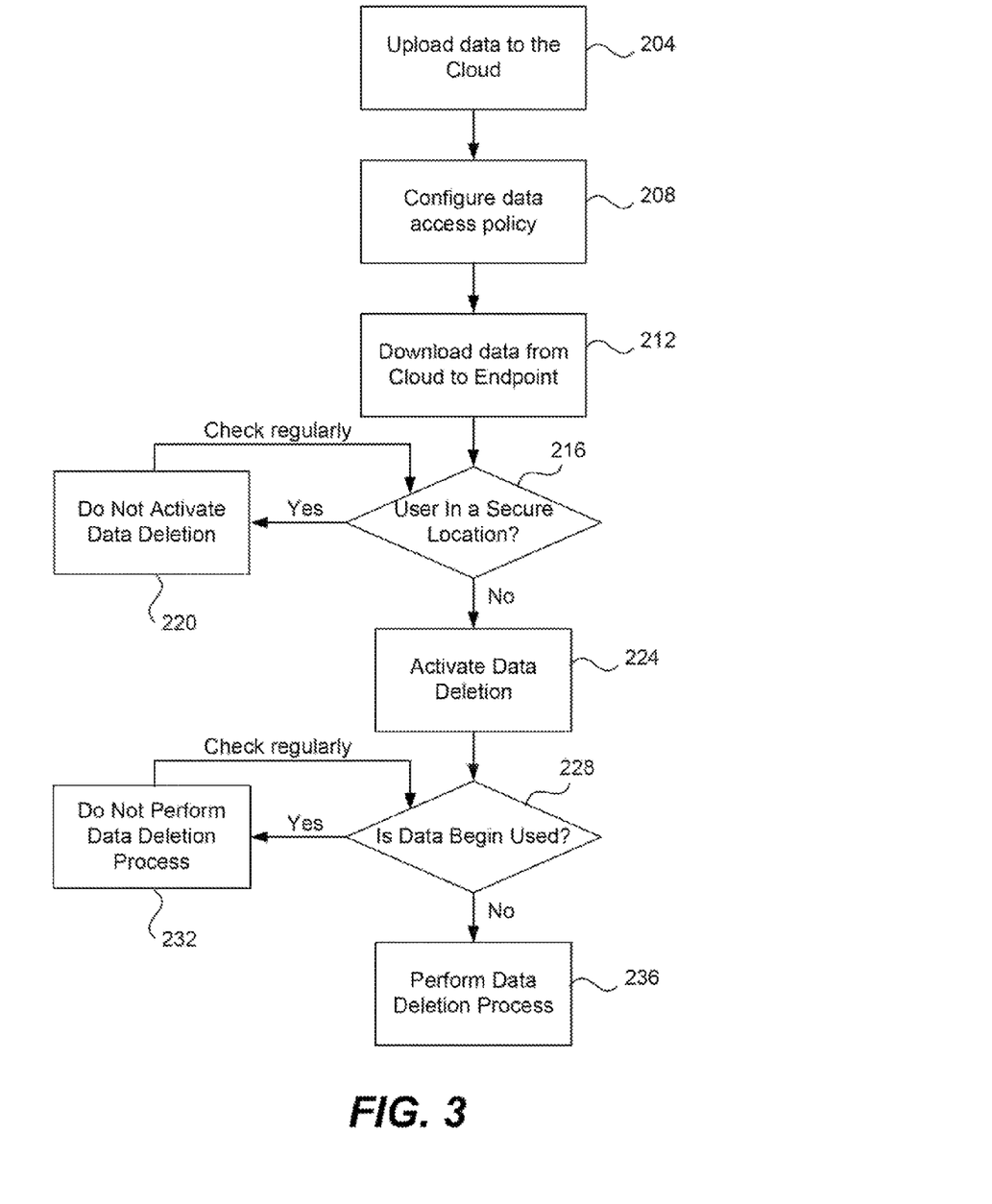
FIG. 3 is a flow diagram describing one embodiment of the present invention by which sensitive data may be deleted from a computing device.

FIG. 3 is a flow diagram describing one embodiment of the present invention by which sensitive data may be deleted from a computing device. In order to keep sensitive data secure until it is actually needed by a user, it may be preferable to store such data "in-the-cloud," that is, upon a remote public or private server computer from which the data may be downloaded over the Internet when needed. The data may or may not be encrypted. When the user needs to access the data, he or she may download it on demand to any endpoint, such as any suitable computing device that can connect to the cloud server. Such an environment is typically termed a "cloud-endpoint" model. Of course, other models may also be used in order to transfer sensitive data to a user's computing device.

In step 204 the user loads, transfers or otherwise makes available his or her data to the "in-the-cloud" server. The user may not necessarily need to upload the data himself; the data may be made available by another entity and the user is then apprised that the data is available for use. For example, a corporate server may contain sensitive data (not necessarily placed there by the user) that the user has permission to download. The data may be a digital computer file such as a document file or text file, a spreadsheet, raw data, an image file of any type, a video file, a source code file, etc.

In step 208 the user, his or her employer, or another entity optionally configures a data access policy covering the sensitive data stored on the "in-the-cloud" computer server. In one embodiment is not necessary to explicitly configure a data access policy because default values may be used, and these values may be any of the values discussed below or other.

One element of a data access policy is specifying secure locations to which the sensitive data may be downloaded and not necessarily deleted, and specifying unsecure locations to which the sensitive data may be downloaded, but where the data will be subject to a data deletion process. For example, a simple policy would state that the user's office computer is a secure location and any data may be downloaded there and not subject to deletion, while a computing device in any other location would not be considered a secure location and data would be subject to deletion.

Location Using IP Address

In one specific embodiment, a secure location may be defined by the user's gateway IP address. In other words, when the gateway IP address of the user's endpoint computing device (the device to which sensitive data may be downloaded) is present on a specific and secure gateway IP list then the user and his or her data is considered to be in a secure location. On the other hand, if the gateway IP address of the computing device is not on the list, then the data is considered to be in an unsecure location. For example, a secure gateway IP list may include the IP addresses at home (1.1.1.1) and at the office (2.2.2.2). Should the user be using an endpoint computing device having a gateway IP address of 3.3.3.3 this means that the user is not in a secure location.

As known in the art, a gateway is a node on a network that serves as an access point to another network or to a computer. For a home network, typically a modem is the physical device which connects local computers to the Internet and also serves as the gateway. In an office situation, a gateway computer will typically connect to internal networks to the Internet. Use of a mobile telephone presents an exceptional situation. When a user connects to the Internet over a mobile telephone there exists a gateway IP address, but by default the present invention will treat the user and the computing device as not being in a secure location because a mobile telephone may be lost, misplaced or stolen rather easily.

For example, the mobile device will often use a Wi-Fi signal to connect to the Internet through an access point. The access point will issue an IP address to the mobile, which will be the mobile's gateway IP address. Similarly, a laptop computer's gateway IP address will be the access point's IP address use to connect to the Internet. Regarding a home computer, the home computer's gateway IP address will be its cable modem's IP address (or the address of any other modem). For a home computer accessing the Internet via a Wi-Fi signal or via a Wi-Max, the gateway IP address with the address supplied by the wireless provider to access the Internet.

Therefore, this first element of the data access policy specifies a secure gateway IP list indicating that the user's endpoint computing device is in a secure location when it is accessing the Internet using one of the IP addresses on that list. This list may be specified and entered by the user, by his employer, by third-party service provider, or may be a default list. This list is stored in conjunction with a computer program embodying the present invention present on the user's computing device, may be stored in persistent memory or in a database on the computing device, or may be stored in another similar location.

Location Using GPS

In an alternative embodiment, this first element of the data access policy specifies a secure location using geographic coordinates and the location of the computing device is determined using GPS (Global Positioning System) technology. As known in the art, many computing devices now contain a GPS receiver that is able to indicate to an associated software program the specific location of the device, often within a matter of feet. This location is typically specified by very accurate longitude and latitude coordinates.

As is known in the art, geographic location information comes from the global positioning system (GPS) which uses a latitude and longitude coordinate system. GPS coordinates may be represented in any number of ways. For example, latitude and longitude are typically represented in units of degrees with decimals, e.g., GPS Latitude: 57 deg 38' 56.83" N
GPS Longitude: 10 deg 24' 26.79" W
GPS Position: 57 deg 38' 56.83" N, 10 deg 24' 26.79" W The suffix for North, South, East or West may also be a prefix. In addition, latitude and longitude made to be expressed in decimal degrees using negative numbers for South and West (e.g., a position of 14.2293, −97.3982). Or, latitude and longitude may be expressed as degrees, minutes and seconds without the use of decimals. Preferably, a representation is used which allows for a precise determination not only of the secure location or locations, but also of the location where the computing device is present at a given point in time.

Figure 4:
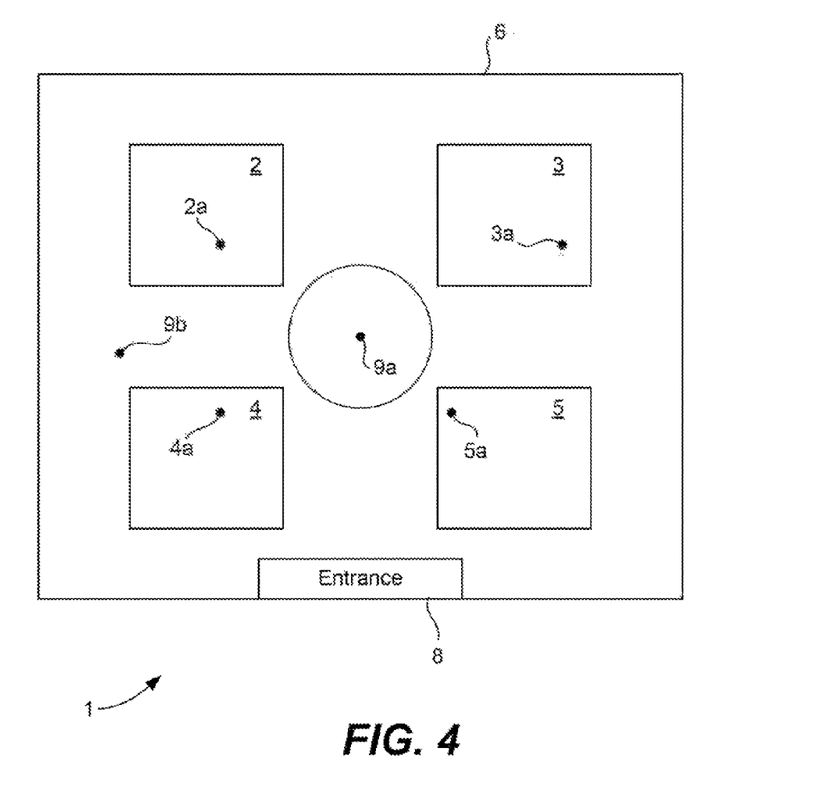
FIG. 4 illustrates a simple diagram of an aerial view for a region.

FIG. 4 illustrates a simple diagram 1 of an aerial view for a region. Shown is a geographical boundary 6 for the region which may be a city, county, larger geographic area, company (or other entity, enterprise, etc.), an entrance 8 (if applicable) and various secure locations within the region such as areas 2, 3, 4, 5 and 9. Shown also are locations 9b, 2a, 3a, 4a and 5a indicating precise locations were a computing device may be located at a future time. The policy may assign a particular data access policy using areas 2, 3, 4, 5 and 9. For example, a company may define a policy that a computing device within areas 2 and 5 (such as at locations 2a and 5a) is not within a secure location, and that a computing device within areas 3 and 4 (such as at locations 3a and 4a) is within a secure location. Or, areas 2, 3, 4, 5 and 9 may be defined as secure locations, and that a computing device located anywhere else (such as at location 9b) is not within a secure location. Accordingly, the policy may define only secure locations, only unsecure locations, or a mixture of both.

The secure locations may be in any shape or form. While areas 2-5 are shown as rectangles, they may be in any shape defined by straight lines having any number of corners. In order to define such a sensitive area using geographical coordinates, the precise longitude and latitude of each corner is given, and from this the area may be determined. For example, sensitive area 2 may be defined by providing the latitude and longitude of each of its four corners. In another embodiment, a secure location may be defined by providing a radial distance from a central, sensitive point. Secure location area 9 is then defined as being an area within a distance of 5 meters from geographical location 9a (thus forming a circular sensitive area).

In another embodiment, a rectangular secure location is defined as a range from a first latitude to second latitude, and a range from a first longitude to a second longitude. In another embodiment, a secure location may be defined as a particular region on a map (for example, the entire property of a company), and the location of a computing device may be compared to that region on the map to determine if the device falls within the secure location.

Other ways to define a secure location include defining a secure location according to a specific department in a corporation. It is possible that there will be separate physical areas for these departments with specific functions. For example, corporation A has an R&D department in City B and City C. We can define a region using a polygon with several vertices. The vertices are identified using longitude and latitude, or a similar coordinate system. A database within device 40 contains definitions of secure locations. An area may be marked as secure (or as unsecure) by determining coordinates that mark the boundaries of that area and then storing that data in the database. The database may be implemented using an internal database of device or by using software such as MySQL, MS SQL Server, Oracle Database, or any other proprietary custom-built indexing system.

Depending upon the coordinates and scheme used to define a secure location, the database may contain different types of information. For example, considering secure location 9, the database will contain an entry consisting of precise latitude and longitude coordinates for the center of the secure location, along with a distance indicating the radius for such an area. For a rectangular secure location (or other area defined by lines and vertices) each entry in the database will consist of the precise latitude and longitude of each vertex of the area. For a secure location defined as a range, each entry for such an area will consist of two precise latitudes and two precise longitudes. For a secure location defined as a region on the map, the database entry will include a graphical depiction of that region on the map.

Examples of how a database would look with particular latitude and longitude coordinates include the following. Table 1 includes secure location identification and latitude/longitude mapping.

TABLE 1

Sensitive Area and Latitude/Longitude Mapping

| Sensitive_area_ID | Start_latitude | Start_longitude | End_latitude | End_longitude |
|---|---|---|---|---|
| 1 | 323.87\0"N | 11847.48\0"E | 330.65\0"E | 11860.11\0"E |
| 2 | 261.55\0"N | 11637.44\0"E | 280.12\0"E | 11649.26\0"E |
| 3 | 247.13\0"N | 11354.97\0"E | 250.32\0"E | 11362.23\0"E |

Once a secure location (or locations) is defined using coordinates, then a policy is defined to handle a future physical location of the computing device. Of course, a policy may also be defined that is a combination of secure locations defined by geographic coordinates and by using a list of gateway IP addresses.

Volatility of Data

A second element of the data access policy involves defining how volatile the sensitive data should be. This element defines how or when the sensitive data should be deleted from the given device if the computing device is in an unsecure location. A time parameter specifies that the sensitive data should be deleted if the data has not been used in time minutes. For example, if the time parameter has a value of 15, this means that if 15 minutes have elapsed the sensitive data was last used, viewed or accessed on the computing device then the deletion of that data will begin. The time parameter may have different values for different types of users, such as a smaller value for normal users and a greater value information technology users.

A degree parameter specifies the degree to which the data will be deleted immediately or a period of time. For example, if the degree parameter has a value of 0, this means that the sensitive data will be deleted immediately once deletion begins; if the parameter has a value of 5 (for example) this means that the data will be deleted gradually over a period of 5 minutes. Of course, other parameters may also be used to help define the volatility of the sensitive data. These parameters are also preferably stored in a database of the computing device or along with the computer program that implements the present invention.

In step 212 at some point in time the user desires to download his or her sensitive data from storage location 20 to the endpoint computing device 40. The user downloads this digital file over network 30 and the file is stored on computing device 40. In order to download the data, the user is preferably connected to the Internet over any suitable wired or wireless network connection. In one embodiment, the computing device knows that this digital file should be marked as sensitive and should be deleted eventually because the file has been downloaded from a specially marked folder or directory on a computer server 20. This special folder is known a priori to contain sensitive digital files, accordingly, any computing device downloading a digital file from this folder is made aware that the file should eventually be deleted using the present technique. The computing device may flag the digital file in order to mark it as being sensitive data that should be deleted.

In a different embodiment, the user (or the computing device) is aware a priori that the digital file is sensitive data and, accordingly, the computing device downloads the file and places it into a specially marked folder or directory on the computing device itself. From that point in time, the computing device knows that any digital files in this specially marked folder must be eventually deleted. In this fashion, the computing device may download any number of sensitive data files or images and be able to eventually delete those that need to be deleted.

In step 216 once the sensitive data has been downloaded to the computing device, the computer program determines that the downloaded digital file contains the sensitive data and that therefore certain checks should be performed. First, the device determines whether or not the device is a secure location; this may be determined by checking whether or not the current gateway IP address is in the list of secure gateway IP addresses or by checking if the present geographical coordinates of the device fall within the coordinates of any secure locations previously defined. If the device is a mobile computing device (such as a mobile telephone, mobile computing tablet, etc.) then a determination is made by default that the location is not secure. The present invention can identify the device type (mobile telephone, laptop computer, home computer, etc.) by looking up any of a variety of operating system information, to determine whether it is a mobile device or laptop, etc.

Checking the gateway IP address of the device and comparing it to the list of secure IP addresses is performed by determining whether the gateway IP address of the device is present within the list of secure IP addresses previously stored in a memory of the computing device during step 208. To obtain the gateway IP address for a laptop or personal computer, e.g., one may use the "IPCONFIG" command; in an Android mobile device (which is Linux based) one may use the "IFCONFIG" command.

Alternatively, the physical location of the computing device (determined using a GPS receiver of the device) is compared to the database of secure locations previously stored during the configure data access policy step 208. For example, the precise longitude and latitude of the device is compared to any of the secure locations shown in FIG. 4 (for example) to determine if the location of the device is found within one of those secure locations. One of skill in the art will understand how to compare a longitude and latitude position with a given area to determine if that position falls within the area.

If the device is in a secure location (e.g., there is a match of gateway IP addresses or when the device is physically within a secure location), then in step 220 a determination is made to not activate data deletion. Periodically, step 216 continues to check whether or not the computing device is in a secure location by comparing the current gateway IP address against the list of secure IP addresses (for example, a check is made every 5 minutes) or by checking the physical location of the device using its GPS coordinates.

If the device is not in a secure location, then step 224 begins the data deletion process for the digital file that has been downloaded. If there are multiple sensitive files then the data deletion process will be activated for each one in turn.

Next, in step 228 as part of the data deletion process the program checks whether or not the sensitive data of the downloaded digital file is being used or not. For example, the sensitive data will be considered being used if any of the following are true: the data is a computer program that is currently executing on the computing device; the data is a computer file that has been opened (it is open) by the user on the computing device; the data is an image file or video file that is currently being displayed on the computing device; the data has been locked by another process, etc.

If the sensitive data is currently being used, then in step 232 a determination is made that the data deletion process should not be initiated at this time. Periodically (for example, every minute), step 228 continues to check whether or not the sensitive data is being used. If the data is not being used at any particular point in time the program checks the time parameter in order to determine whether not enough time has elapsed to make a final determination that the data is not being used and that the data deletion process should be begun. If enough time has elapsed then control moves to step 236. If not, then the program continues to check back regularly in order to determine if the time parameter has elapsed. One technique for checking whether not time has elapsed is to use an alarm function of the computing device. For example, the Alarm Manager functionality found within an Android computing device may be used.

In step 236 the data deletion process is begun for the sensitive data because the time parameter has elapsed and the data is not being used. The data deletion process first checks the degree parameter in order to determine whether to delete the data immediately or to delete the data over the specified time interval. Deleting the data over a time interval has the advantage in that some of the data will remain over the interval to allow the user to view it, use it or read it if desired. This gradual deletion saves the user from potentially having to download the entire digital file all over again which would consume time, resources and money. For example, if the user is reading a 10-page document that is gradually being deleted, the user may be reading pages 9 and 10 while the earlier pages are being gradually deleted and will not need to download the entire document all over again.

If the time interval is the value of 0, then it is a straightforward matter to delete the sensitive data from the computing device so that the sensitive data does not remain in memory or in any storage of the computing device. One skilled the art will understand how to remove a digital file from a memory, from a hard disk, from persistent storage, etc. Any of a number of techniques to permanently erase a digital file from a hard disk, for example, may be used.

On the other hand, if the time interval is greater than 0, then the digital file will be deleted from the computing device gradually using any of a variety of techniques. For an image file or for a video file, a multiple-layer image compression technology may be used to gradually delete the sensitive data. For example, certain known image transformations (such as DCT or FFT) may be used to gradually delete the data. FIG. 2 shows an image 110 that is to be deleted. As shown, progressive images 120-150 show that the image is gradually deleted over a period of time using an image transformation technique.

For a document file (such as a text file, spreadsheet, etc.) the data may be deleted gradually over time by using a page-by-page deletion method. For example, if the time interval for deletion is N minutes, and there are numerous pages in the document, then a page will be removed at every 1/N minute. Or, a page may be removed from the document using a different algorithm (or even using random time periods) as long as the time interval specified by the degree parameter is still satisfied (by making sure that all the pages of the document are deleted by the end of the time interval). Other techniques for gradually deleting a document file may also be used. For example, other techniques for transforming data such as offset sequencing technology, and text to image mechanisms may also be used.

Once the data deletion process has been completed then the flowchart ends.

Computer System Embodiment

Figure 5A:
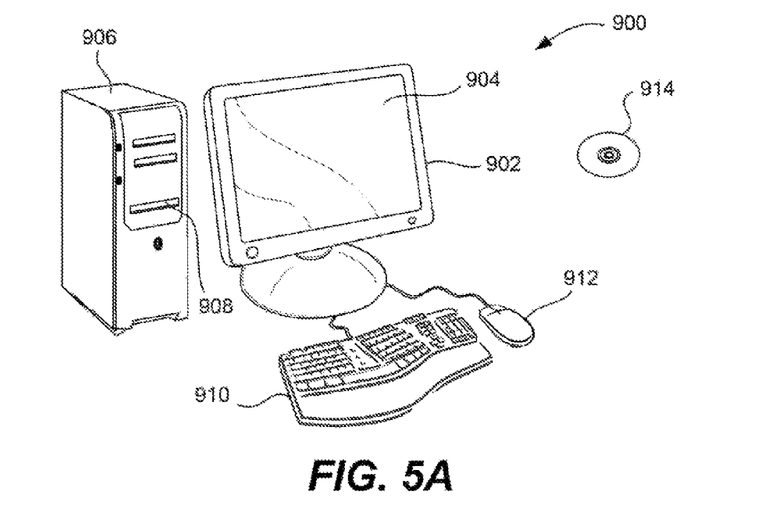
FIGS. 5A and 5B illustrate a computer system suitable for implementing embodiments of the present invention.
Figure 5B:
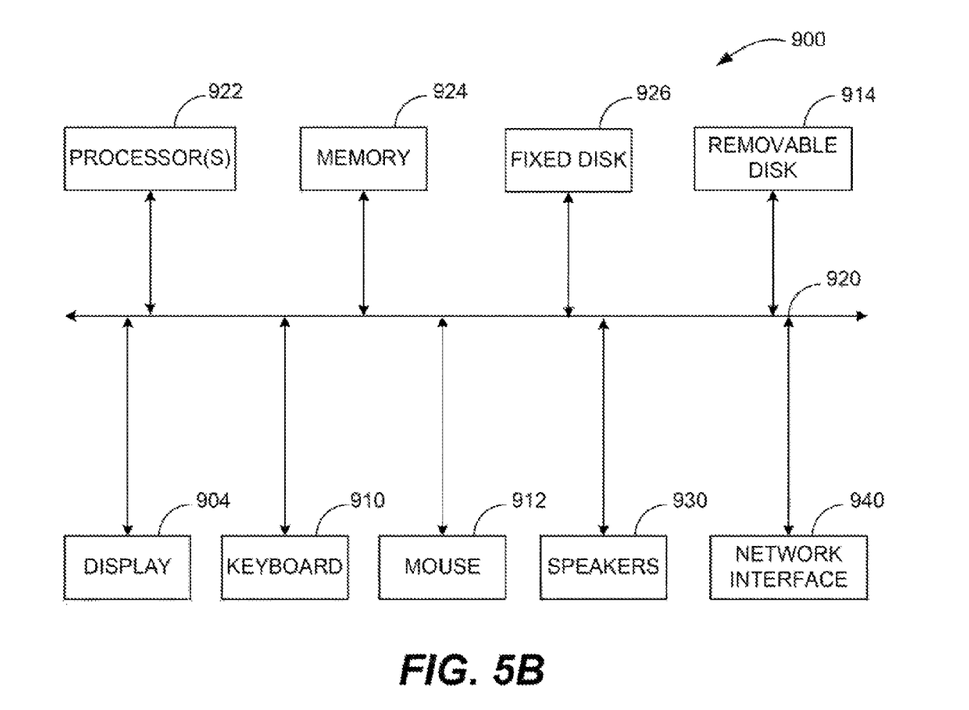

FIGS. 5A and 5B illustrate a computer system 900 suitable for implementing embodiments of the present invention. FIG. 5A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 5B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of deleting a digital file, said method comprising:
    defining a data access policy including an identification of a secure location and storing said data access policy within a computing device;
    defining a degree parameter as part of said data access policy that indicates a time interval;
    downloading a digital file subject to said data access policy from a computer server to said computing device;
    determining whether said computing device is in said secure location;
    initiating a deletion process when it determined that said computing device is not in said secure location;
    as part of said deletion process, determining whether said digital file is currently being used on said computing device; and
    deleting said digital file from said computing device gradually over said time interval when it is determined that said digital file is not currently being used on said computing device, wherein said digital file is deleted gradually by successively transforming an image of said digital file such that said image becomes successively more blurry.

2. The method as recited in claim 1 further comprising:
    defining a time parameter as part of said data access policy; and
    determining that said digital file is not being used on said computing device when said digital file has not been used on said computing device for a period of time equivalent to said time parameter.

3. The method as recited in claim 1 further comprising:
    deleting said digital file gradually by sequentially deleting portions of said digital file.

4. The method as recited in claim 1 further comprising:
    periodically checking to determine whether said computing device is in said secure location.

5. The method as recited in claim 1 further comprising:
    periodically checking to determine whether said digital file is being used on said computing device.

6. The method as recited in claim 1 further comprising:
    determining that said computing device is not in a secure location by determining that said computing device is a mobile computing device.

7. The method as recited in claim 1 further comprising:
    as part of said deletion process, determining whether said digital file is being executed, is currently open, is being displayed, or is currently locked on said computing device; and
    deleting said digital file from said computing device when it is determined that said digital file is not being executed, is not currently open, is not being displayed, nor is currently locked on said computing device.

8. The method as recited in claim 1 further comprising:
    as part of said deletion process, determining whether said digital file is being executed, is currently open, is being displayed, or is currently locked on said computing device; and
    not deleting said digital file from said computing device when it is determined that said digital file is being executed, is currently open, is being displayed, or is currently locked on said computing device.

9. The method as recited in claim 1 further comprising:
    not deleting said digital file from said computing device when it is determined that said digital file is currently being used on said computing device.

10. A method of deleting a digital file, said method comprising:
    defining a data access policy including an identification of secure IP addresses and storing said data access policy within a computing device;
    defining a degree parameter as part of said data access policy that indicates a time interval;
    downloading a digital file subject to said data access policy from a computer server to said computing device;
    determining whether said computing device is in a secure location by comparing an IP address of said computing device with said secure IP addresses;
    initiating a deletion process when it determined that said computing device is not in said secure location;
    as part of said deletion process, determining whether said digital file is currently being used on said computing device; and
    deleting said digital file from said computing device gradually over said time interval when it is determined that said digital file is not currently being used on said computing device, wherein said digital file is deleted gradually by successively transforming an image of said digital file such that said image becomes successively more blurry.

11. The method as recited in claim 10 further comprising:
    defining a time parameter as part of said data access policy; and
    determining that said digital file is not being used on said computing device when said digital file has not been used on said computing device for a period of time equivalent to said time parameter.

12. The method as recited in claim 10 wherein said IP address of said computing device is a gateway IP address of said computing device and wherein said secure IP addresses are a plurality of gateway IP addresses.

13. The method as recited in claim 10 further comprising:
    periodically checking to determine whether said computing device is in said secure location.

14. The method as recited in claim 10 further comprising:
    periodically checking to determine whether said digital file is being used on said computing device.

15. The method as recited in claim 10 further comprising:
    as part of said deletion process, determining whether said digital file is being executed, is currently open, is being displayed, or is currently locked on said computing device; and
    deleting said digital file from said computing device when it is determined that said digital file is not being executed, is not currently open, is not being displayed, nor is currently locked on said computing device.

16. The method as recited in claim 10 further comprising:
as part of said deletion process, determining whether said digital file is being executed, is currently open, is being displayed, or is currently locked on said computing device; and
not deleting said digital file from said computing device when it is determined that said digital file is being executed, is currently open, is being displayed, or is currently locked on said computing device.

17. The method as recited in claim 10 further comprising:
not deleting said digital file from said computing device when it is determined that said digital file is currently being used on said computing device.

18. The method as recited in claim 10 further comprising:
deleting said digital file gradually by sequentially deleting portions of said digital file.

19. A method of deleting a digital file, said method comprising:
defining a data access policy including an identification of a secure geographic region and storing said data access policy within a computing device;
defining a degree parameter as part of said data access policy that indicates a time interval;
downloading a digital file subject to said data access policy from a computer server to said computing device;
determining whether said computing device is in a secure location by comparing GPS co-ordinates of said computing device with said secure geographic region;
initiating a deletion process when it determined that said computing device is not in said secure location;
as part of said deletion process, determining whether said digital file is currently being used on said computing device; and
deleting said digital file from said computing device gradually over said time interval when it is determined that said digital file is not currently being used on said computing device, wherein said digital file is deleted gradually by successively transforming an image of said digital file such that said image becomes successively more blurry.

20. The method as recited in claim 19 further comprising:
defining a time parameter as part of said data access policy; and
determining that said digital file is not being used on said computing device when said digital file has not been used on said computing device for a period of time equivalent to said time parameter.

21. The method as recited in claim 19 wherein said secure geographic region identifies the physical location of a business enterprise.

22. The method as recited in claim 19 further comprising:
periodically checking to determine whether said computing device is in said secure location.

23. The method as recited in claim 19 further comprising:
periodically checking to determine whether said digital file is being used on said computing device.

24. The method as recited in claim 19 further comprising:
as part of said deletion process, determining whether said digital file is being executed, is currently open, is being displayed, or is currently locked on said computing device; and
deleting said digital file from said computing device when it is determined that said digital file is not being executed, is not currently open, is not being displayed, nor is currently locked on said computing device.

25. The method as recited in claim 19 further comprising:
as part of said deletion process, determining whether said digital file is being executed, is currently open, is being displayed, or is currently locked on said computing device; and
not deleting said digital file from said computing device when it is determined that said digital file is being executed, is currently open, is being displayed, or is currently locked on said computing device.

26. The method as recited in claim 19 further comprising:
not deleting said digital file from said computing device when it is determined that said digital file is currently being used on said computing device.

27. The method as recited in claim 19 further comprising:
deleting said digital file gradually by sequentially deleting portions of said digital file.

\* \* \* \* \*